No. 670,388. Patented Mar. 19, 1901.
C. H. HOWLAND-SHERMAN.
FLY WHEEL.
(Application filed July 5, 1900.)
(No Model.) 2 Sheets—Sheet 2.
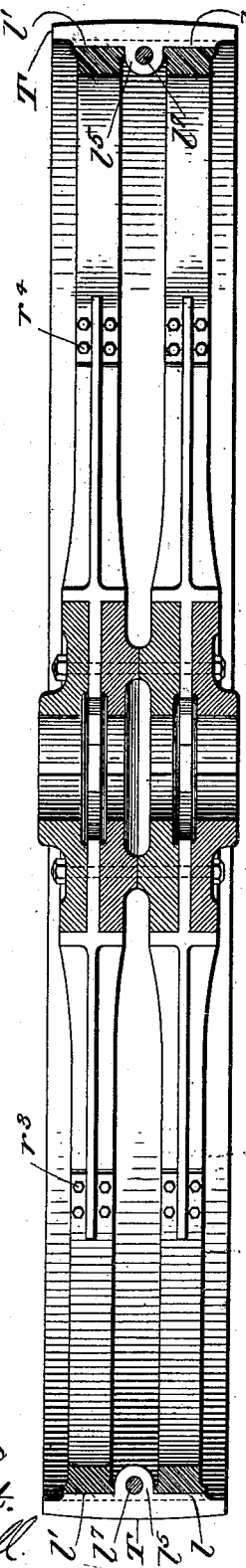
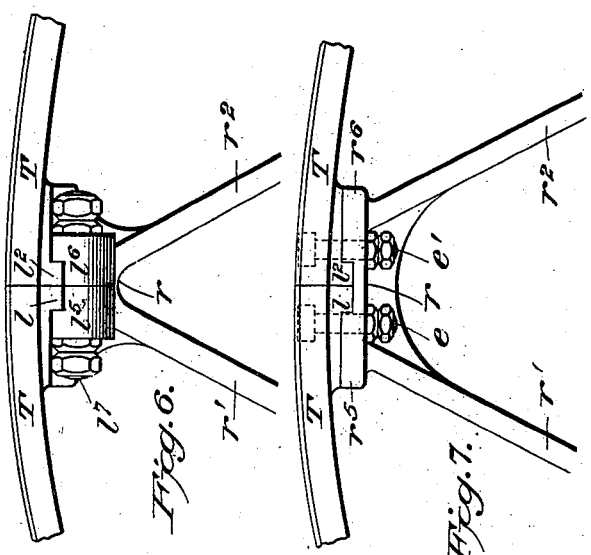
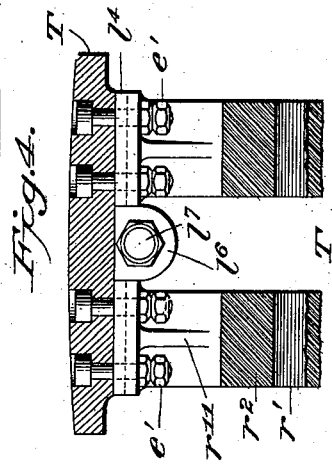
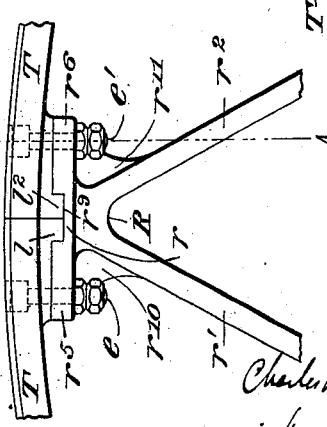

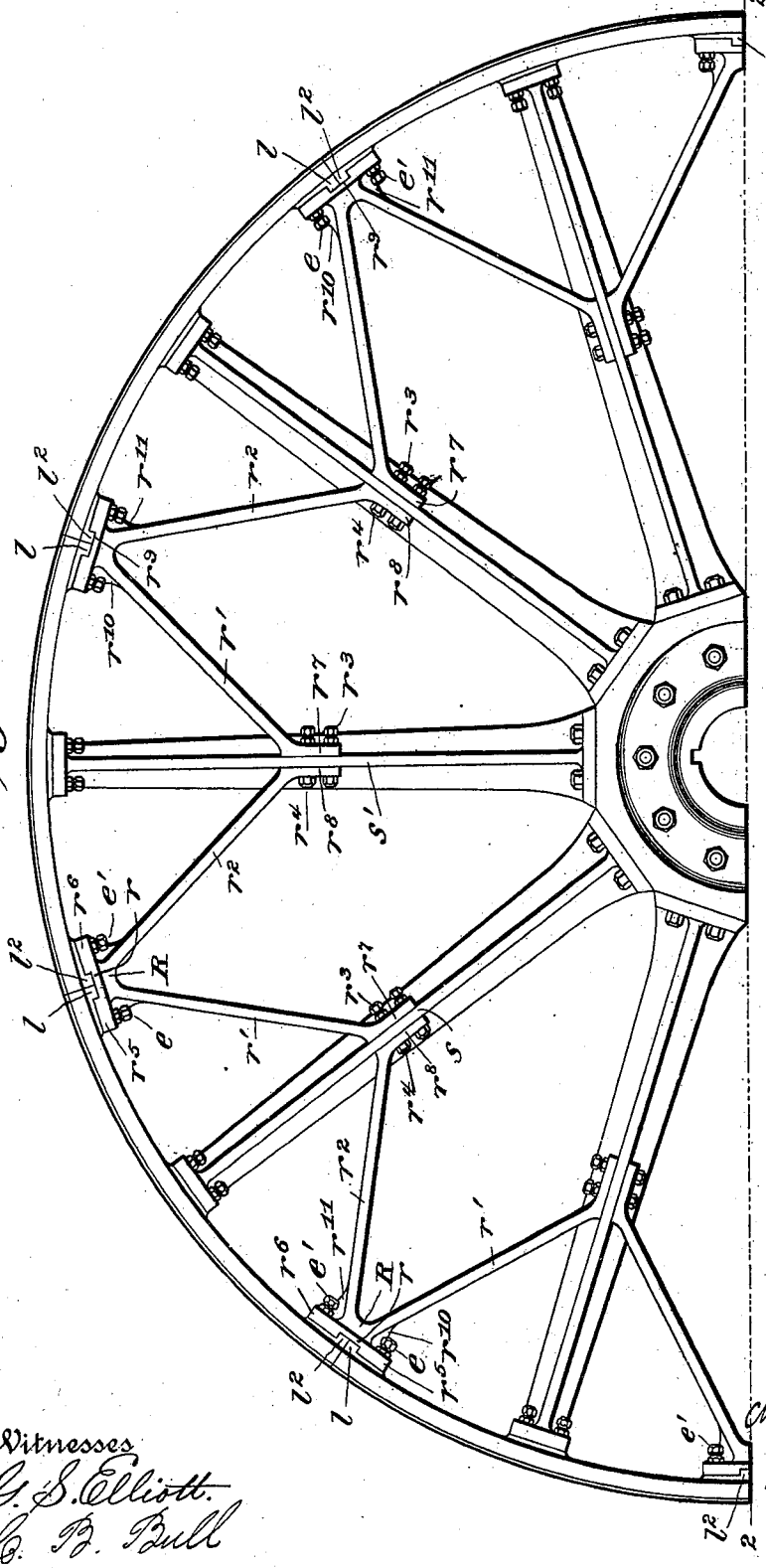

UNITED STATES PATENT OFFICE.

CHARLES H. HOWLAND-SHERMAN, OF PATHFINDER, DISTRICT OF COLUMBIA, ASSIGNOR OF ONE-FOURTH TO GEORGE H. HOWARD, OF WASHINGTON, DISTRICT OF COLUMBIA, AND SAMUEL G. B. COOK, OF LONDON, ENGLAND.

FLY-WHEEL.

SPECIFICATION forming part of Letters Patent No. 670,388, dated March 19, 1901.

Application filed July 5, 1900. Serial No. 22,598. (No model.)

*To all whom it may concern:*

Be it known that I, CHARLES H. HOWLAND-SHERMAN, a citizen of the United States, residing at Pathfinder, in the District of Columbia, have invented a new and useful Improvement in Fly-Wheels, of which the following is a specification, reference being had to the accompanying drawings and to the letters of reference marked thereon.

My invention pertains to improvements in fly or main driving wheels, its object being to furnish means for joining the rim-segments of such wheels which shall have a strength equal to the full modulus of rupture of the least solid rim-section between said junctures.

As it is the practice of all engineers, following the leading authorities, to segmentalize all fly-wheels exceeding about ten feet in diameter, the method of joining these segments becomes an important consideration as affecting the safety of using the wheel. At the high peripheral velocities made by wheels of these large radii their structures are subjected to vast centrifugal bursting moments, which experience shows has frequently resulted in the explosion of the wheels, attended by complete disruption of the mechanism used for joining the segments.

Heretofore it has usually been considered by leading authorities to be impracticable to provide means for segment-joining whose disruptive resistance shall fully equal the least tensional modulus of the least rim cross-section intermediate to such junctures, and it is one of the objects of this invention to provide a construction which shall fulfil the particular requirement of a full equality of strength between the means of joining the parts and of the parts so joined. I accomplish this object by the mechanism illustrated in the accompanying drawings, hereby made a part of this specification, in which—

Figure 1 is a side elevation of one-half of a wheel whose segments are joined by means of my invention. Fig. 2 is a section through the same wheel on the line 2 2 of Fig. 1. Fig. 3 is an enlarged exterior detail of one of the segment-junctures. Fig. 4 is a transverse section through the rim and segment-joining mechanism, taken on the line 4 4 of Fig. 3, giving a sectional view of the rim-bolts in position and showing the bolting-lug and cap-pieces in elevation. Fig. 5 is a transverse section through the rim and segment-joining mechanism with one of the stay-pieces of the rim removed, showing the recesses into which its bolts fit to secure the rim and showing in elevation the shear-lug designed to be inclosed by the cap-piece, as indicated by the dotted line at the right hand of the figure. Fig. 6 is an exterior elevation of a portion of the parts shown in elevation by Fig. 3, demonstrating the respective positions of the shear and bolting lugs and stay-pieces. Fig. 7 is a side elevation of a modified form of the cap-piece sometimes used to inclose the shear-lugs in constructing my invention.

Similar letters of reference indicate similar parts throughout the several views.

Laterally-registering duplex shear-lugs $l$ $l'$ are cast integrally upon the rim T, having between them bolting-lugs $l^5$, also cast integrally upon said rim in such manner that the end faces of all of said lugs are plane with the radial assembling-faces of the ends of the rim-segments T, as clearly shown in Fig. 2 and further indicated in Figs. 5 and 6.

The cap-pieces $r$ of the rim-stays R, Figs. 1 and 3, are firmly drawn against the rim-segments T by the bolts $e$ $e'$ passing through the flanges $r^5$ $r^6$, and any radial disruptive tendency of the rim at this juncture is stopped by reference of such stress along the stay-piece lugs $r'$ $r^2$, attached by bolts $r^3$ $r^4$, uniting their feet $r^7$ $r^8$ to the spokes $s$ $s'$, as heretofore described in an application filed by me November 22, 1899, Serial No. 737,919.

The cap-piece $r$ has a transverse slot $r^9$, which firmly and accurately incloses both of the shear-lugs $l$ $l^2$ of the respective segments of the rim T united at this juncture. The effect of this rigid inclosure is to present the said shear-lugs in single shear against the interior slot-faces of the cap-piece $r$ upon a plane of shear lying along the outer face of said cap-piece, as clearly illustrated in Figs. 1, 3, and 7. The stress thus developed under bursting moment of the rim T in operating the wheel is referred at once in opposite directions through the respective flanges $r^5$ $r^6$, which are prevented from consequent inward deflection by the stiffening-ribs $r^{10}$ $r^{11}$, formed integrally between said flanges and the legs $r'$ $r^2$. This enables the resistance of the cap-piece $r$ to exactly balance the single shear of the lugs $l$ $l^2$. As indicated in elevation by Fig. 2 and by dotted lines in Fig. 4, the opposite laterally-registering shear-lug $l'$ faces up against a companion shear-lug $l^4$ and is embraced by its respective cap-piece in an exactly similar manner to the condition of the lugs $l$ $l^2$, just described. The duplication of the shear-lug juncture on either side especially equalizes the destructive tendencies developed in wheels of very broad face.

My joining mechanism is completed by the bolting-lugs $l^5$ $l^6$, (shown in Figs. 2, 4, 5, and 6,) which have inward faces plane with the radial assembling-faces of the segments T and are drawn firmly together by the double-lock-nutted union-bolts $l^7$, as shown in Figs. 2, 4, 5, and 6. The action of these lugs, they being integral with the segments, is equivalent to that of a beam *encastré* with respect to forces tending to part the rim-segments T in lines of tangency to the rim, which parallelize the outer face of the cap-piece $r$. The bending moment of said lugs under such stress is an equilibrium with the tensional value of the bolt $l^7$. The effect of the lugs $l^5$ $l^6$ with respect to forces tending to radially disrupt the segment-juncture in a direction perpendicular to the outer face of the cap-piece $r$ is to develop the single shear of the bolt $l^7$, which stands in equilibrium with the double shear of such portion of each bolt-lug $l^5$ or $l^6$ as equals in width the diameter of said bolt $l^7$ and extends radially inward through said lug.

The combined effect of my invention is that the single shears of each laterally-registering set of shear-lugs $l$ $l^2$ $l'$ $l^4$, combined with the resistances of the bolting-lugs $l^5$ $l^6$, with their union-bolt $l^7$, present an aggregate resistance to rupture which is not less than the modulus of rupture of the least solid rim-section between any two junctures on the rim of the wheel.

Having thus described my invention, I claim—

1. Combined in a wheel, rim-segments having shear-lugs at the joining ends thereof, members for embracing said lugs and for developing their shearing resistance, and means for attaching said embracing members to the rim-segments, substantially as set forth.

2. Combined in a wheel, rim-segments, shear-lugs at the joining ends thereof, and means for embracing said lugs and for developing their shearing resistance, substantially as set forth.

3. In a wheel, the combination of rim-segments, facing shear-lugs made integral with the joining ends of the segments, means for embracing said lugs and for developing the shearing resistance thereof, means for attaching said embracing members to the rim-segments, and means for attaching said embracing members to the spokes of the wheel, substantially as set forth.

4. In a wheel, the combination of segments, facing shear-lugs, members for embracing said lugs and for developing the shear thereof, means for attaching said embracing members to the rim-segments, means for attaching said embracing members to the spokes of the wheel, facing bolting-lugs formed integrally on the ends of the segments, and means for uniting said bolting-lugs to each other, substantially as set forth.

In testimony whereof I hereunto set my hand.

CHARLES H. HOWLAND-SHERMAN.

Witnesses:
EDWIN S. CLARKSON,
KATHERINE E. MANNING.